(12) United States Patent
Hannemann et al.

(10) Patent No.: US 9,057,791 B2
(45) Date of Patent: Jun. 16, 2015

(54) QUANTUM-COUNTING RADIATION DETECTOR

(75) Inventors: Thilo Hannemann, Erlangen (DE); Silke Janssen, Forchheim (DE); Steffen Kappler, Effeltrich (DE); Edgar Kraft, Erlangen (DE); Daniel Niederlöhner, Erlangen (DE); Mario Reinwand, Breitbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 267 days.

(21) Appl. No.: 13/526,641

(22) Filed: Jun. 19, 2012

(65) Prior Publication Data

US 2012/0326049 A1 Dec. 27, 2012

(30) Foreign Application Priority Data

Jun. 21, 2011 (DE) .................. 10 2011 077 859

(51) Int. Cl.
*G01T 1/24* (2006.01)

(52) U.S. Cl.
CPC .................... *G01T 1/243* (2013.01)

(58) Field of Classification Search
CPC ....................................................... G01T 1/243
See application file for complete search history.

(56) References Cited

U.S. PATENT DOCUMENTS

| | | | | |
|---|---|---|---|---|
| 4,651,005 A | * | 3/1987 | Baba et al. ................ | 250/360.1 |
| 7,916,836 B2 | | 3/2011 | Du | |
| 2003/0173522 A1 | | 9/2003 | Spartiotis | |
| 2005/0105687 A1 | | 5/2005 | Heismann et al. | |
| 2006/0081785 A1 | | 4/2006 | Heismann et al. | |
| 2006/0086913 A1 | | 4/2006 | Spahn | |
| 2007/0114423 A1 | | 5/2007 | Vester | |
| 2007/0272871 A1 | | 11/2007 | Schafer et al. | |
| 2008/0099689 A1 | | 5/2008 | Barber | |
| 2009/0080601 A1 | | 3/2009 | Tkaczyk et al. | |
| 2009/0121145 A1 | * | 5/2009 | Rostaing et al. ........ | 250/370.08 |
| 2010/0020922 A1 | | 1/2010 | Carmi | |
| 2010/0181491 A1 | | 7/2010 | Goldan | |
| 2010/0270473 A1 | | 10/2010 | Kraft et al. | |

FOREIGN PATENT DOCUMENTS

| | | |
|---|---|---|
| CN | 1642482 A | 7/2005 |
| CN | 1750786 A | 3/2006 |
| CN | 1951107 A | 4/2007 |
| CN | 1971652 A | 5/2007 |

(Continued)

OTHER PUBLICATIONS

J. Pribil, B. Zatko, I. Frollo, F. Dubecky, P. Scepko, J. Mudron: "Quantum Imaging X–ray CT Systems Based on GaAs Radiation Detectors Using Perspective Imaging Reconstruction Techniques" in Measurement Science Review, vol. 9, Section 3, No. 1, 2009 pp. 27-32; 2009.

*Primary Examiner* — Constantine Hannaher
(74) *Attorney, Agent, or Firm* — Harness, Dickey & Pierce, P.L.C.

(57) ABSTRACT

A quantum-counting radiation detector in which signals of individual pixels and signals of combined pixels are evaluated in parallel processing branches and count results are combined in an appropriate manner, thereby reducing the influence of unwanted interference effects for the respective application.

15 Claims, 4 Drawing Sheets

(56) References Cited

FOREIGN PATENT DOCUMENTS

| CN | 101501526 A | 8/2009 |
| DE | 102004048962 A1 | 4/2006 |
| WO | WO 2004008488 A2 | 1/2004 |
| WO | WO 2009042827 A1 | 4/2009 |

* cited by examiner 64x summation signal     (800 μm)  } 1st effective
16x summation signal     (400 μm)  } signal   } 2nd effective
4x summation signal       (200 μm)  ................ } signal   } Effective
Individual pixel signal  (100 μm)  ................ } signal

QUANTUM-COUNTING RADIATION DETECTOR

PRIORITY STATEMENT

The present application hereby claims priority under 35 U.S.C. §119 to German patent application number DE 10 2011 077 859.4 filed Jun. 21, 2011, the entire contents of which are hereby incorporated herein by reference.

FIELD

At least one embodiment of the present invention generally relates to a quantum-counting radiation detector, in particular an x-ray detector, including an array of detector elements, which each generate a charge quantity as a function of the energy of incident radiation quanta and are divided into groups of adjacent detector elements to form larger detector units, a first processing stage, allowing an electrical signal to be supplied for each of the groups respectively, the electrical signal being a function of the sum of the generated charge quantities of the detector elements of the group, and a second processing stage, allowing the x-ray quanta striking the respective groups to be counted by evaluating the electrical signals supplied, in order to obtain a count result for each group.

BACKGROUND

Quantum-counting x-ray detectors are used in many imaging applications. X-ray detectors of this type are used for example in computed tomography systems for medical imaging, to produce a tomographic x-ray image of an examination region of a patient. With a quantum-counting radiation detector different unwanted effects occur as a function of the size of the individual detector elements, hereafter also referred to as pixels, resulting in conflicting requirements when selecting the pixel size of the detector. The smallest possible pixel size is advantageous for the high flux response, to reduce the probability of the pile-up effect and to utilize the small pixel effect. However it is advantageous to select the largest possible pixels for good energy resolution, in order to reduce the unwanted effects of charge sharing and the K-escape on the energy registered in a pixel. The last-mentioned two effects have a greater influence on the measurement result with smaller pixels. Moreover these unwanted effects also make an additional noise contribution due to their statistical occurrence. Pixel size selection also ultimately determines the achievable spatial resolution of the x-ray detector.

In many applications these contradictory requirements require compromises when selecting the size of the detector elements or the pixel size, eroding the advantage of a quantum-counting detector compared with an energy-integrating detector. Thus when a quantum-counting detector is used in a clinical computed tomography system, the required x-ray flux necessarily requires the selection of a pixel size of only 100 μm to 300 μm, as otherwise the pixel would be forced into paralysis at full x-ray flux and would no longer supply usable data. However with such small pixel sizes, when quantum-counting detectors, particularly those made of CdTe or CZT (CdZnTe), are used, the loss of energy resolution and the additional noise contribution due to charge sharing and K-escape are already significant.

A quantum-counting x-ray detector is known from WO 2009/042827, wherein larger detector units are formed from the individual detector elements, by adding or otherwise combining the count results of a number of adjacent detector elements. However this procedure brings with it no advantage in respect of the unfavorable effects of K-escape and charge sharing, as the resulting error can no longer be determined and corrected from the count results alone.

US 2009/0080601 describes a quantum-counting x-ray detector, wherein the detector elements are combined dynamically to form larger detector units, by bringing the detector elements into electrical contact with one another by way of a matrix of switches and forwarding the resulting signal to a common comparator. This method requires an estimation of the expected x-ray flux before measurement, with the result that its suitability is limited in many applications. The abrupt switching between the different sizes of the resulting detector units also gives rise to major problems, as the requirement of a continuously differentiatable connection condition for the signals resulting from the different pixel sizes cannot be satisfied in a simple manner.

A quantum-counting x-ray detector is known from DE 10 2004 048 962, wherein the charge pulses of adjacent detector elements are added together in an analog manner when they are identified by a coincidence circuit as being associated with a photon event.

Finally WO 2004/008488 illustrates a detector according to the preamble of claim 1, wherein the signals from a number of detector elements are summed in an analog manner and then forwarded to a common discriminator and counter, to utilize the small pixel effect.

The two last-mentioned charge summing methods cannot however improve the response of the detector with high flux. Their paralysis response corresponds approximately to that of a detector with pixels, the area of which corresponds to the overall area of the pixels combined respectively to form a larger detector unit. A charge summing method which combines for example the signals from four pixels demonstrates approximately the same paralysis response as an individual pixel of four times the basis area, so detector paralysis starts at approximately a quarter of the quantum flux.

SUMMARY

In at least one embodiment, a quantum-counting radiation detector is specified, which allows more flexible tailoring to the respective application, to keep the influence of the unwanted effects as small as possible.

A quantum-counting radiation detector includes, in at least one embodiment, an array of detector elements, each generating a charge quantity as a function of the energy of incident radiation quanta and being divided into groups of adjacent detector elements to form larger detector units, a second processing stage, allowing a first electrical signal to be supplied for each of the groups respectively, the electrical signal being a function of the sum of the generated charge quantities of the detector elements of the group, and a second processing stage, allowing the radiation quanta striking the respective groups to be counted by evaluating the first electrical signals supplied, in order to obtain a first count result for each group.

In the proposed radiation detector of at least one embodiment, the first processing stage also supplies a second electrical signal as a function of the generated charge quantity of the detector element or the subgroup for each detector element or for each subgroup of detector elements, into which the groups are divided and the second processing stage also counts the radiation quanta striking each detector element or each subgroup by evaluating the second electrical signals supplied, in order to obtain a second count result for each individual detector element or for each subgroup of detector elements, and by combining the first and second count results calculates image information or a first effective signal, which is processed further to generate the image information.

BRIEF DESCRIPTION OF THE DRAWINGS

The proposed radiation detector is described again briefly below with reference to example embodiments. In the drawing.

DETAILED DESCRIPTION OF THE EXAMPLE EMBODIMENTS

Figure 1:
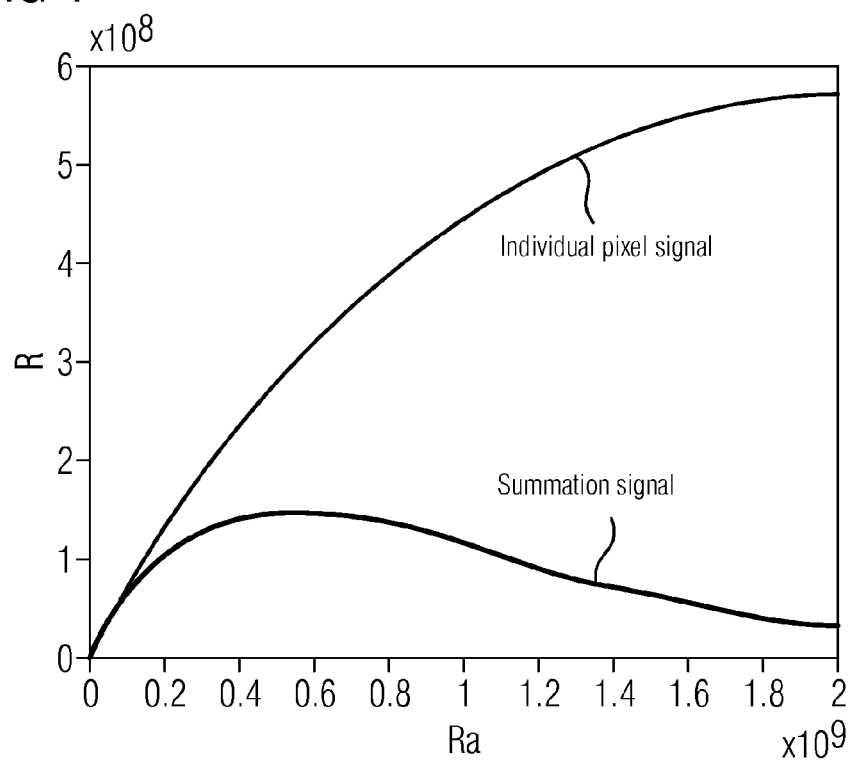
FIG. 1 shows an example of paralysis curves of individual pixels and combined pixels.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A quantum-counting radiation detector includes, in at least one embodiment, an array of detector elements, each generating a charge quantity as a function of the energy of incident radiation quanta and being divided into groups of adjacent detector elements to form larger detector units, a second processing stage, allowing a first electrical signal to be supplied for each of the groups respectively, the electrical signal being a function of the sum of the generated charge quantities of the detector elements of the group, and a second processing stage, allowing the radiation quanta striking the respective groups to be counted by evaluating the first electrical signals supplied, in order to obtain a first count result for each group.

In the proposed radiation detector of at least one embodiment, the first processing stage also supplies a second electrical signal as a function of the generated charge quantity of the detector element or the subgroup for each detector element or for each subgroup of detector elements, into which the groups are divided and the second processing stage also counts the radiation quanta striking each detector element or each subgroup by evaluating the second electrical signals supplied, in order to obtain a second count result for each individual detector element or for each subgroup of detector elements, and by combining the first and second count results calculates image information or a first effective signal, which is processed further to generate the image information.

With the proposed radiation detector of at least one embodiment, therefore, two independent processing branches are implemented alongside one another. On the one hand individual detector elements or pixels are combined for processing, in order thus to form a larger cohesive detector unit, also referred to hereafter as a macro pixel. Thus for example four adjacent detector elements, in this context also referred to as subpixels, can be combined respectively in the known manner to form a macro pixel, by adding the charge quantity generated by the four subpixels in an analog manner and then forwarding it for processing by counting. Independently thereof, in the other processing branch, a separate processing is performed preferably for each individual detector element or pixel or subpixel, by forwarding the charge quantity generated by said detector element or a signal derived therefrom after amplification similarly for processing by counting.

Thus the proposed radiation detector of at least one embodiment combines a number of detector elements or pixels to form a macro pixel, but with each individual pixel undergoing separate signal processing and even having its own counter as with a conventional detector. At the same time the charge pulse or electrical signal, of the subpixels associated with a macro pixel is summed in an analog manner and forwarded to a separate counter circuit or discriminator/counter circuit. This parallel signal processing and evaluation produce both count results for the individual detector elements and count results for the larger detector units. These can be combined according to the application, so that the unwanted effects have the smallest possible influence for the application during measurement or image recording.

The combination of count results preferably takes place here by weighting the first and second count results differently. It can thus be decided retrospectively whether the counter readings of the individual detector elements are used with greater weight or exclusively to improve the high flux response or whether the counter readings of the detector units are used with greater weighting or exclusively to improve energy resolution. Since the combination of count results can be performed after radiation detection or an x-ray recording in time, the knowledge of the actually measured x-ray flux can also be used for the evaluation.

In embodiments of the present patent application the concepts of the first processing stage and the second processing stage are not to be understood as closed processing units. Rather the first processing stage covers the processing of the charge quantities generated by the detector elements up to the input of the comparator or discriminator, which in this context then counts with the counter for the second processing stage. The first processing stage can thus comprise for example a preamplifier and a signal shaper, as known. Naturally a number of comparators or discriminators can also be used in the second processing stage, to allow energy-selective further processing or counting.

The proposed radiation detector of at least one embodiment can be for example a solid state detector made of CdTe or CZT. Naturally other types of solid state or flat screen detector can also be implemented.

The separate processing for the individual detector elements and the larger detector units over the two separate processing branches can be achieved in different ways with the proposed radiation detector. The charge quantity generated by each detector element when struck by a radiation quantum must be distributed here to the separate processing branches. In one embodiment this can be done by direct distribution of the change to the two processing branches. Some of the generated charge quantity is fed to the one processing branch, the rest to the other processing branch.

This circuit variant can have a very simple structure, using a capacitive splitter for example, but has the disadvantage of the higher level of noise due to the reduced signal charge in each processing branch. Therefore the branching into the two processing branches is preferably only performed after one or more processing steps, in which an electrical signal, for example a current pulse, a voltage pulse or a fixed voltage (in the case of a peak holder signal), is generated from the charge generated in a detector element. The electrical signal is then distributed to the two processing branches. This in turn can be done by direct distribution or by duplication of the signal.

Distribution here does not always have to take place half at a time but can be performed with a different ratio, as long as said ratio is known. If the analog signal processing consists for example of a chain made up of preamplifier, signal shaper and comparator stage, the output signal can be duplicated behind the preamplifier or behind the signal shaper. The copies of the signal then proceed on the one hand to the further processing chain of the individual detector element and on the other hand to the processing chain of the detector unit. If the preamplifier has a feedback branch, a duplicate of the feedback signal can also serve as a signal for the detector unit.

A further class of technical implementation uses what are known as peak holders for each detector element. These are switching circuits which detect and store the maximum value of the input signal within a certain time period. In this variant the sum of the peak holder signals of the individual detector elements is used as the signal for the detector unit. Different embodiments are possible here too, depending on whether the peak holder is timed or triggered or operates continuously. Different variants are also possible for the embodiment of the summation stage in the processing branch of the detector units. For example processing can take place by way of the summation of currents, which are proportional to the signal level in the respective detector element.

In a further advantageous embodiment, the second processing stage is configured so that it combines the first and second count results according to a predefined calculation rule, in order to obtain a combined count result therefrom as image information for the subsequent image representation for each individual pixel. The image representation itself takes place in the known manner, by assigning an intensity value or gray scale value proportional to the (combined) count result to each pixel as image information.

With the predefined calculation rule a weighting function is used when combining the two count results, which in one embodiment is calculated from the previously defined paralysis curves of the individual pixel signal and of the summation signal (for the detector unit). In this process in a first step the paralysis curves are determined for the individual pixel signal and summation signal. For use in x-ray imaging this can be done for example by varying the tube current of the x-ray tube or by varying the attenuation of the x-ray radiation in a previously performed x-ray image recording. The next step takes the form of the parameterization of the paralysis curves by polynomials P:
Re=P(F, ae) and
Rs=P(F, as), where P(F, a)=$\Sigma i$ ai Fi
Re and Rs here indicate the measured quantum flux R in the case of the individual pixel signal Re and in the case of the summation signal Rs. F represents the applied quantum flux. P is the polynomial with the factors ai.

The calculation of the cross-fade weight function W used later to combine the count results takes place according to the following rule:

$$W(F,ae,as)=[P(F,ae)-P(F,as)]/P(F,ae)$$

There follows a coordinate transformation Re→F=p(Re, ae) by way of the (in some instances approximate) reverse function of P(F, ae):

$$W(F,ae,as) \rightarrow w(Re,ae,as)=W(p(Re,ae),ae,as)$$

After this coordinate transformation the measured data Re and Rs can be offset for the effective signal R:

$$R=Rs+w(Re,ae,as)Re$$

This calculation rule allows the count results for the sub-pixels and macro pixels to be offset against one another so that an optimal high-flux response results but in the low flux instance the advantages of the larger area of the macro pixel are fully implemented for charge-sharing and K-escape.

Switching in the proposed quantum detector can of course also take place in such a manner that cascaded processing results. The proposed distribution to two processing branches here is extended successively to subgroups, hereafter referred to as first, second, . . . subgroups, as will be explained briefly below in one of the example embodiments. A first effective signal is calculated here from the count results of the group and its first subgroups respectively, the effective signal in turn being combined with the count result of the (second) subgroups of the first subgroup to give a second effective signal, etc. This preferably continues until combination takes place with the count results of the individual detector elements (as the last subgroup).

The proposed quantum-counting radiation detector is preferably configured as an x-ray detector, which can be used for example very advantageously in medical imaging, in particular in the field of computed tomography. Naturally the proposed structure of the radiation detector is not however limited to the detection of x-ray radiation.

FIG. 1 shows the differences in the response of a quantum-counting x-ray detector between the processing of an individual detector element or pixel and the combination of a number of pixels to form a macro pixel. The figure shows what is known as a paralysis curve, in which the measured quantum flux R, i.e. the quantum flux R determined over the count result, is shown as a function of the quantum flux density F striking the detector, in each instance multiplied by pixel area A and pulse duration τ, for the individual pixel signal and the summation signal (here a sum of four individual pixel signals). The individual pixel signal represents the sum of the measured rates or count results from the individual pixels. It can be seen clearly in the figure that the summation signal demonstrates a response, which roughly represents the response of an individual pixel with an area enlarged by the factor 4. R here is the measured rate, Ra the applied rate, both in arbitrary units. Thus saturation and therefore falsification of the measurement signal already occurs with roughly a quarter of the applied quantum flux compared with the individual pixel signal.

With an embodiment of the proposed quantum detector individual pixels are also combined to form a larger macro pixel in a processing branch during processing, by summing the electrical charge quantities of the individual pixels or the electrical signals derived therefrom in an analog manner and then supplying the result as a summation signal for evaluation by counting. In a parallel processing chain however the respectively generated charge quantity is also converted to an electrical signal for all the individual pixels, and likewise supplied for evaluation by counting, separately for each individual pixel. The count results from the individual pixels and the macro pixels are then combined in an appropriate manner, to obtain an effective count signal for each individual pixel. A weighting function is introduced for this purpose, being used to combine the two count results for each pixel.

Figure 2:
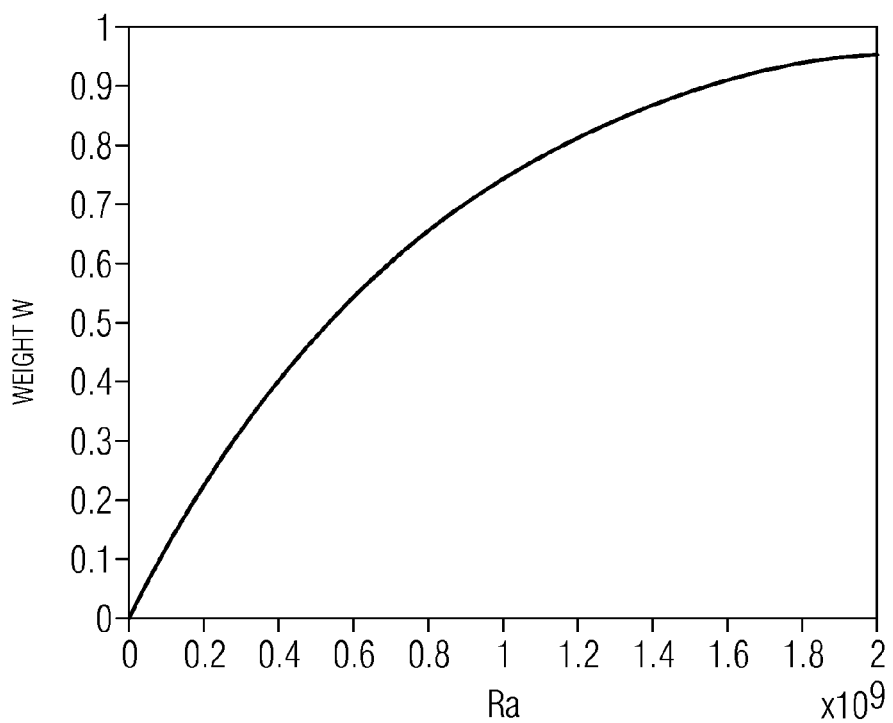
FIG. 2 shows an example of a cross-fade weight function used during processing as a function of the applied flux.
Figure 3:
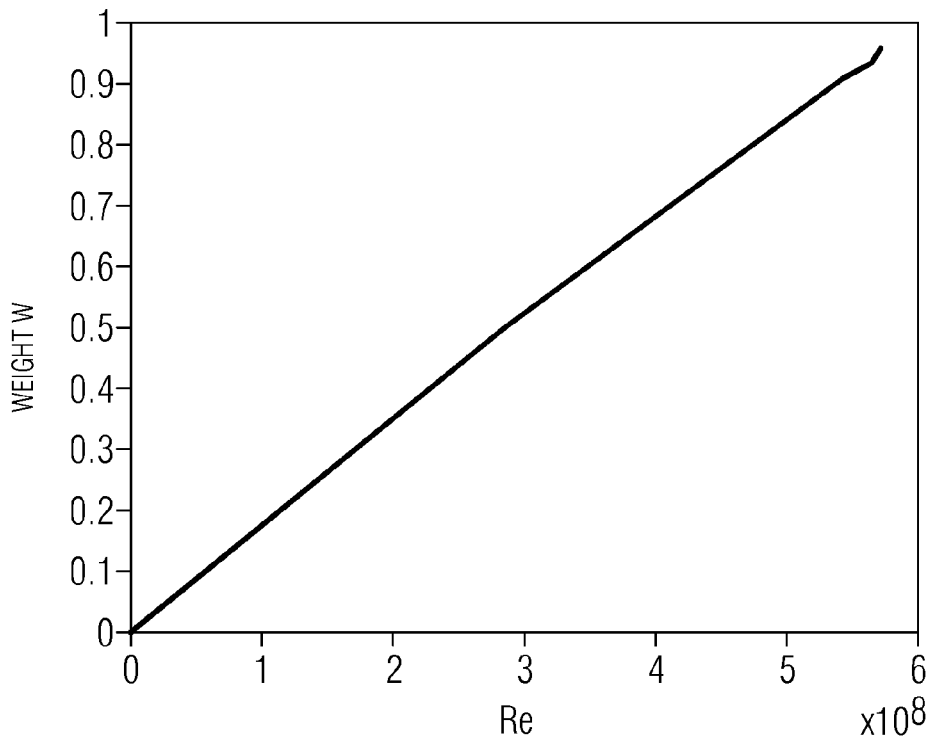
FIG. 3 shows an example of the cross-fade weight function as a function of the measured individual pixel signal.

In an embodiment, the weighting function is determined from the previously determined or measured paralysis curves for the individual pixel and the macro pixel according to a rule, as already set out above. FIG. 2 shows an example of a cross-fade weight function W determined thus as a function of the applied flux F or the applied rate Ra. FIG. 3 shows this cross-fade weight function again as a function of the measured individual pixel signal Re, again in arbitrary units. It can be seen from this figure that this weight function can be approximated linearly with very good correspondence so that in many instances the weight function can also be determined without previously established paralysis curves.

Figure 4:
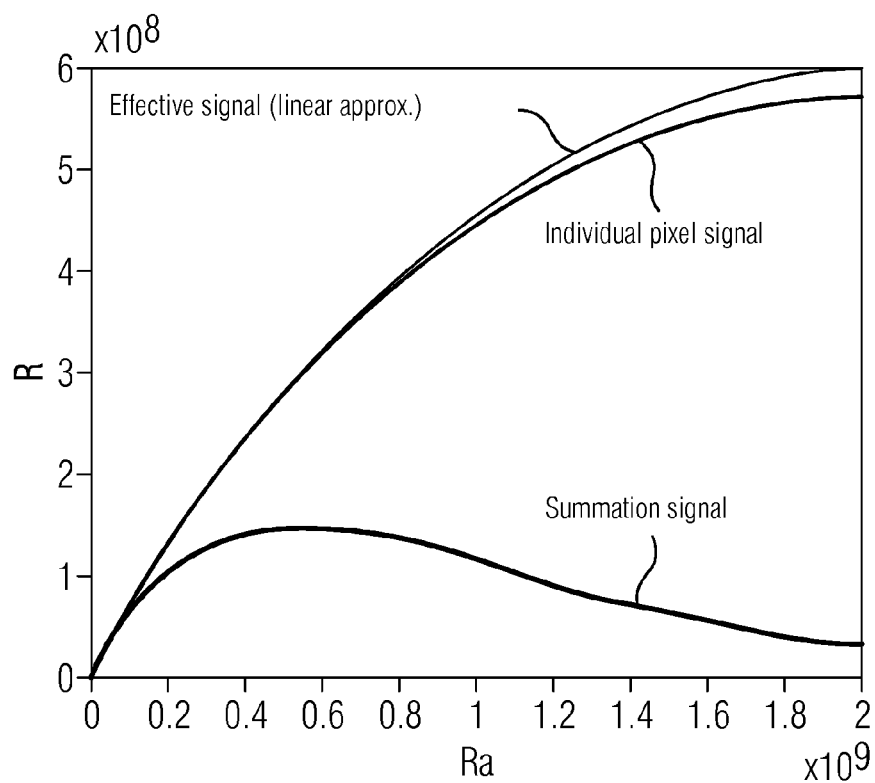
FIG. 4 shows an example of the measured signals and the effective signal generated in the present radiation detector from ideal and approximate cross-fading.

FIG. 4 also shows the two measured signals, i.e. the individual pixel signal and the summation signal (see FIG. 1) and the effective signal determined using the proposed rule from ideal and approximate cross-fading.

Figure 5:
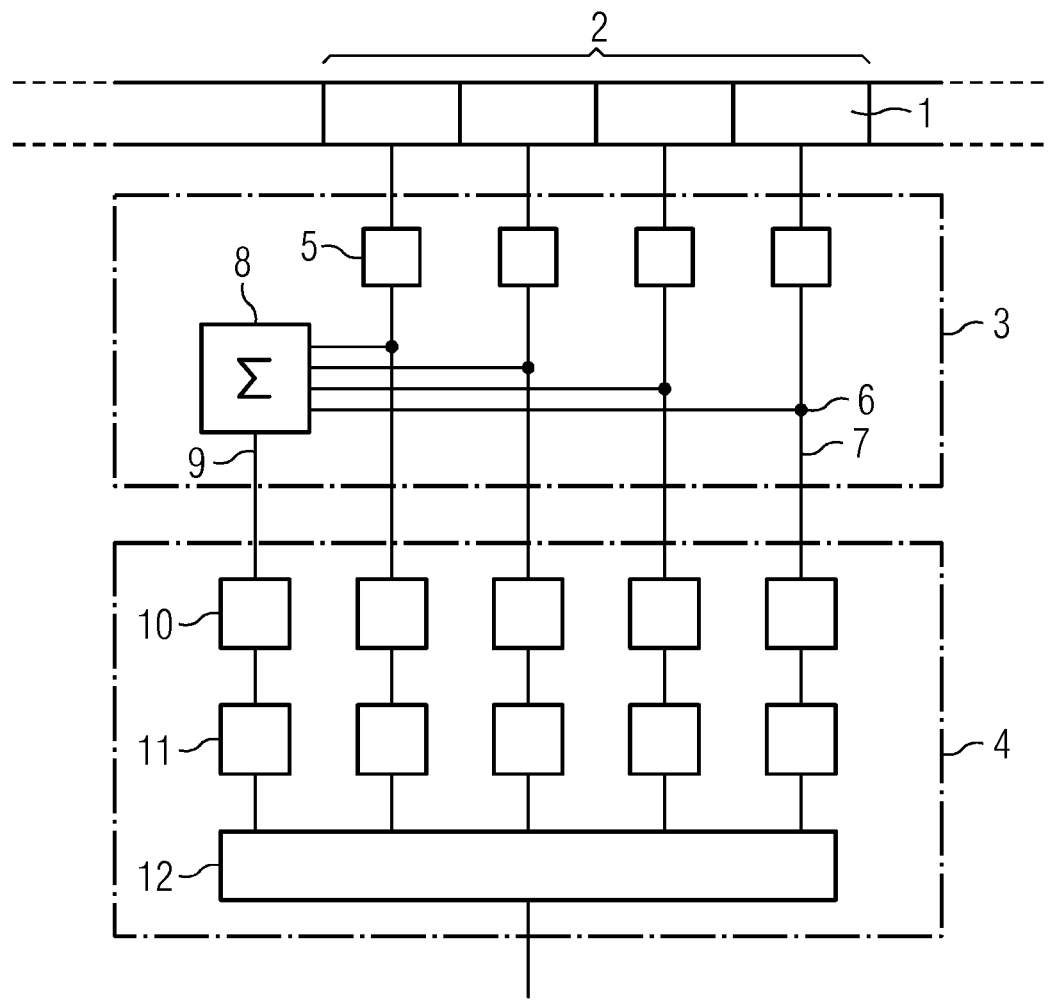
FIG. 5 shows an example of the schematic structure of the proposed radiation detector.

FIG. 5 shows a schematic example of a structure of the proposed radiation detector. In this example four detector elements or pixels 1 of the detector are shown simply for illustration, being combined in one of the processing branches to form a macro pixel 2. The charge quantities generated by the individual pixels 1 when struck by radiation quanta are first read out in the first processing stage 3 by way of a corresponding read-out and signal amplification unit 5 and converted to an electrical signal. The electrical signal is then distributed by way of branching units 6 to the two processing branches.

In one of the processing branches these electrical signals 7 are forwarded to the second processing stage 4, in which a discriminator 10 and a counter 11 connected thereto are provided for each pixel 1. In the second processing branch the electrical signals 7 are summed in an analog manner in a summing unit 8 and the resulting electrical signal 9 is then forwarded in the second processing stage 4 to a discriminator 10, which is connected to a counter 11. As a result the combination unit 12 of the second processing stage receives the count results of the individual pixels 1 and of the macro pixel 2. The count results are then combined in an appropriate manner in this combination unit 12, to obtain a count result that is influenced as little as possible by interference effects for each individual pixel and/or each macro pixel.

This procedure can of course be cascaded in any manner, with the individual pixel in FIG. 1 then representing a first macro pixel made up of a number of pixels in the first cascading stage and the macro pixel in FIG. 1 then being made up of a number of these first macro pixels. The resulting effective signal is then in turn used as the input signal for a second cascade, in which said signal is combined with signals from a number of even smaller macro pixels. The entire procedure is continued until a combination with individual pixel signals results that produces the final effective signal.

Figures 6, 7:
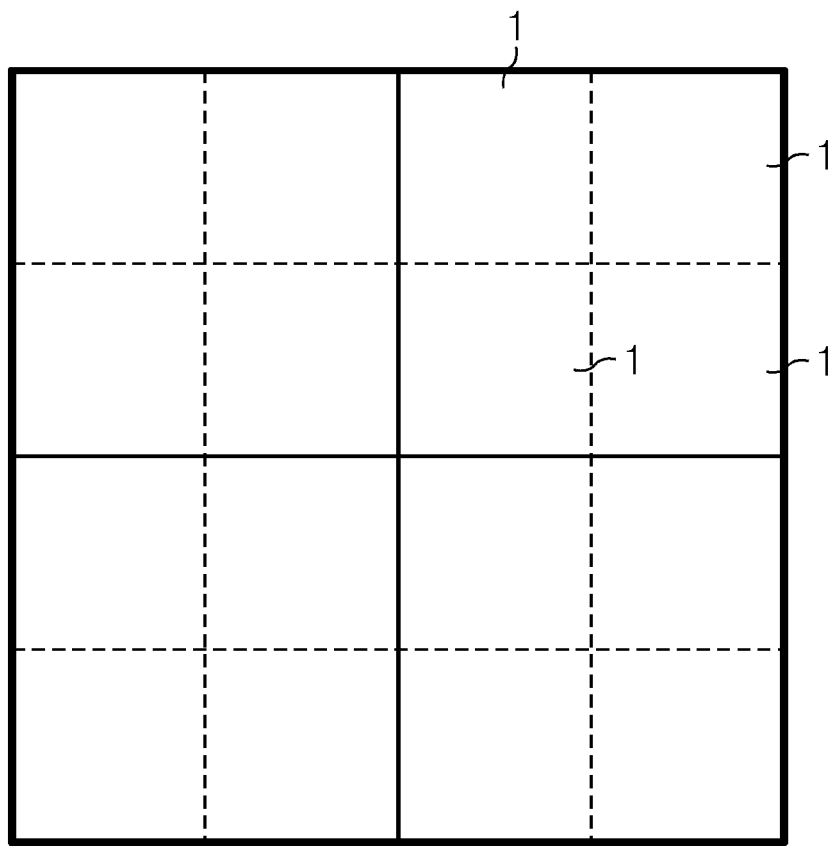
FIG. 6 shows a possible geometric implementation of the combination of subpixels to form macro pixels of different sizes and FIG. 7 shows an example of signal processing of the proposed radiation detector by cascade formation.

FIG. 7 shows this procedure schematically by way of example for the summation signal over 64 individual pixels corresponding to an edge length of the macro pixel of 800 μm, combined with a summation signal over 16 individual pixels corresponding to an edge length of the macro pixel of 400 μm, to produce a first effective signal. The first effective signal is then combined with a summation signal over four individual pixels corresponding to an edge length of the macro pixel of 200 μm, to produce a second effective signal. The second effective signal is finally combined with the individual pixel signal to produce the effective signal for the image representation. An edge length of 100 μm was assumed here for the individual pixel.

FIG. 6 shows a top view of a highly schematic representation of a detail of a detector with 16 individual pixels 1, the combination of which into groups of four and groups of sixteen is shown in each instance with a thick edge.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A quantum-counting radiation detector, comprising:
    an array of detector elements, each of the detector elements being configured to generate a charge quantity as a function of energy of incident radiation quanta, the array of detector elements being divided into groups of adjacent detector elements to form larger detector units;
    a first processing stage, allowing a first electrical signal to be supplied for each of the groups, each of the respective first electrical signals being a function of a sum of the generated charge quantities of the respective detector elements of the group; and
    a second processing stage, allowing x-ray quanta striking each respective group to be counted by evaluating the respective first electrical signals supplied, in order to obtain a respective first count result for each respective group,
        the first processing stage being configured in such a manner to supply a respective second electrical signal as a function of the generated charge quantity of the respective detector element or the respective first subgroup for each respective detector element or for each respective first subgroup of detector elements, into which the groups are divided, and
        the second processing stage being configured in such a manner to count the respective radiation quanta striking each respective detector element or each respective first subgroup by evaluating the respective second electrical signals supplied, in order to obtain a second count result for each respective detector element or for each respective first subgroup, and by combining the respective first and second count results to calculate respective image information or a first respective effective signal, wherein the first processing stage and the second processing stage are further configured to process said first electrical signals and said second electrical signals in parallel.

2. The radiation detector of claim 1, wherein the first processing stage includes a facility for distributing the charge quantity generated by each respective detector element or each respective first subgroup to two separate processing branches, with the generation and evaluation of the first electrical signals taking place in one of the two processing branches and the generation and evaluation of the second electrical signals taking place in the other of the two processing branches.

3. The radiation detector of claim 2, wherein the second processing stage is configured to combine the count results according to the following formula:

$$R=R_s+w(R_e)*R_e,$$

where $R_s$ is the measured quantum flux of the respective group or the first count result and $R_e$ is the measured quantum flux of the respective detector element or the second count result and w corresponds to a weighting function.

4. The radiation detector of claim 3, wherein the weighting function is determined from a difference between paralysis curves of the individual detector elements and groups of detector elements.

5. The radiation detector of claim 1, wherein the first processing stage includes a facility for distributing the second electrical signals supplied for each respective detector element or each respective first subgroup to two separate processing branches, with the generation and evaluation of the first electrical signals taking place in one of the two processing branches and evaluation of the second electrical signals taking place in the other of the two processing branches.

6. The radiation detector of claim 5, wherein the second processing stage is configured to combine the count results according to the following formula:

$$R=R_s+w(R_e)*R_e,$$

where $R_s$ is the measured quantum flux of the respective group or the first count result and $R_e$ is the measured quantum flux of the respective detector element or the second count result and w corresponds to a weighting function.

7. The radiation detector of claim 6, wherein the weighting function is determined from a difference between paralysis curves of the individual detector elements and groups of detector elements.

8. The radiation detector of claim 1, wherein the second processing stage comprises at least one discriminator and a counting facility for each respective group and for each respective detector element or each respective first subgroup.

9. The radiation detector of claim 8, wherein the second processing stage includes a number of discriminators for each respective group and for each respective detector element or each respective first subgroup, to allow energy-selective counting of the incident radiation quanta.

10. The radiation detector of claim 8, wherein the second processing stage is configured to combine the count results according to the following formula:

$$R=R_s+w(R_e)*R_e,$$

where $R_s$ is the measured quantum flux of the respective group or the first count result and $R_e$ is the measured quantum flux of the respective detector element or the second count result and w corresponds to a weighting function.

11. The radiation detector of claim 10, wherein the weighting function is determined from a difference between paralysis curves of the individual detector elements and groups of detector elements.

12. The radiation detector of claim 1, wherein the second processing stage is configured to combine the count results according to the following formula:

$$R=R_s+w(R_e)*R_e,$$

where $R_s$ is the measured quantum flux of the respective group or the first count result and $R_e$ is the measured quantum Mix of the respective detector element or the second count result and w corresponds to a weighting function.

13. The radiation detector of claim 12, wherein the weighting function is determined from a difference between paralysis curves of the individual detector elements and groups of detector elements.

14. The radiation detector of claim 1, wherein the first processing stage is configured to supply a (k+2)th electrical signal as a function of the sum of the generated charge quantity of the detector elements of the (k+1)th subgroup for each (k+1)th subgroup of detector elements, into which the kth subgroups are divided, where k=1 . . . n, and wherein the second processing stage is configured to count the radiation quanta striking each (k+1)th subgroup by evaluating the (k+2)th electrical signals supplied, in order to obtain a (k+2)th count result for each (k+1)th subgroup, and calculates a (k+1)th effective signal in each instance by combining the kth effective signals and (k+2)th count results.

15. The radiation detector of claim 1, wherein the radiation detector is an x-ray detector.

* * * * *